UNITED STATES PATENT OFFICE.

P. M. McGILL, OF WASHINGTON, DISTRICT OF COLUMBIA.

IMPROVEMENT IN ARTIFICIAL FUEL.

Specification forming part of Letters Patent No. 98,786, dated January 11, 1870.

*To all whom it may concern:*

Be it known that I, P. M. McGILL, of the city of Washington, District of Columbia, have invented a new, cheap, and portable Artificial Fuel, of which the following is a full and exact description:

My invention consists in the utilization of coal-dust, waste, or the screenings of coal, and I propose to do this in two ways: First, by agglutinating or forming it into solid, compact, and portable cakes or lumps of fuel by mixing it with silicious clay—particularly with that kind known as silicate of magnesia—and alumina or aluminous clay, and sawdust, in the manner hereafter described; and, second, by agglutinating it by means of magnesia, when slackened with a solution of chloride of magnesium, in the manner also hereinafter described.

To every person engaged in coal-mining, coal-merchants, &c., the loss and annoyance arising from the ever-increasing accumulations of millions of tons of utterly valueless coal-dust are well known. Many attempts have been made to utilize this material as a fuel by restoring it, in some degree, to its original compact and solid state, but so far all have proved abortive, from one cause or another, the principal of which were the impossibility of finding an agglutinant cheap enough to enable the fuel produced to compete with coal, and the impossibility of forming an article of sufficient solidity and hardness to be able to resist the shocks consequent upon transportation, or to hold together while burning.

After many years' experimenting I have overcome all these defects, and have produced from coal-dust a fuel suitable for all the purposes for which fuel is used, and one which burns longer, brighter, and steadier than lump-coal, producing more heat, and is freer from smoke and noxious smells, and is capable of being handled and transported like the ordinary coal, and sufficiently cheap to undersell all others.

The manner in which I form my fuel, with clay as an agglutinant, is as follows: I take of aluminous clay about one and a half bushel, which I dilute or melt to a paste with water, either hot or cold. To the paste I add about five bushels of coal dust or screenings—anthracite, bituminous, or any other kind—and one-half bushel of sawdust, and mix them well together, like mortar, until they become thoroughly incorporated, amalgamated, and agglutinated, and form a thick, tenacious dough. While in this state the compound is formed or shaped, by any suitable means, into cakes and lumps, as required, and left in the open air, protected from rain, until dried, when they become hard and solid, like bricks, and fit for transportation; or the clay, coal-dust, and sawdust may be mixed and amalgamated while dry, and afterward worked into a dough with water, in the same manner; or the compound may be kneaded in a brick-machine and pressed into cakes like bricks, and dried in a kiln.

In agglutinating the coal-dust by means of magnesia slackened with a solution of chloride of magnesium, I use about one bushel of the cement so formed to about twenty bushels of coal-dust, and mix, knead, and bake the compound in the manner above described.

The fuel formed by both these processes ignites rapidly, and makes a very hot, bright, pleasant and agreeable fire, of long continuance, slowly burning into ashes without forming clinkers or producing flame, smoke, or any disagreeable smell. It is hard, solid, and glutinous in its nature, and is, therefore, readily transported, and costs only the expense of manufacture, which, when performed by machinery, will hardly reach fifty cents per ton.

For the working of blast-furnaces, where coal cannot be used on account of its fusibility and large proportion of sulphur, this fuel is particularly well adapted; and for the working of iron and steel generally it is much superior even to coke, forming, as it does, a solid, compact, and very dense body, which acts, when burning, in the same manner as the best charcoal. It is also particularly well adapted for use in locomotives, being free from dust and sparks.

A fuel superior to charcoal for working in iron, steel, glass, &c., can be made by mixing, with the agglutinates above described, the dust or finer particles of coke. This forms a fuel entirely free from sulphur, and very dense.

I do not confine myself to the proportions of the ingredients used, or to the manner in which they are mixed, or to the mode of making the cakes or lumps of fuel, or the manner in which they are dried; but What I do claim as my invention, and desire to secure by Letters Patent, is—

1. Compounding an amalgamating silicious clay—particularly that known as silicate of magnesia—and alumina or aluminous clay with coal-dust, waste, or screenings of coal and sawdust, so as to agglutinate and form, by means of kneading and drying or baking, a solid, hard, tenacious, and combustible substance for fuel, as herein described.

2. The compounding of silicious clay and sawdust with coke-dust, as herein described, and for the purpose set forth.

3. Coal or coke dust or screenings, when agglutinated by means of magnesia slackened with a solution of chloride of magnesium in a more or less concentrated state, as above described.

In testimony that I claim the foregoing artificial fuel as my invention I have hereunto set my hand this 1st day of September, 1869.

P. M. McGILL.

Witnesses:
 GEO. W. McGILL,
 M. H. N. KENDIG.